(12) United States Patent
Davis et al.

(10) Patent No.: US 7,386,204 B1
(45) Date of Patent: Jun. 10, 2008

(54) OPTICAL FILTER HAVING A SHAPED FILTER FUNCTION

(75) Inventors: Michael A. Davis, Glastonbury, CT (US); Alan D. Kersey, South Glastonbury, CT (US); Martin A. Putnam, Cheshire, CT (US); Timothy J. Bailey, Longmeadow, MA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/648,525

(22) Filed: Aug. 26, 2000

(51) Int. Cl.
*G02B 6/34* (2006.01)

(52) U.S. Cl. ..................................... 385/37

(58) Field of Classification Search ............... 385/24, 385/27, 37; 359/130
See application file for complete search history.

(56) References Cited

U.S. PATENT DOCUMENTS

| | | | |
|---|---|---|---|
| 4,725,110 A | 2/1988 | Glenn et al. | 350/3.61 |
| 4,807,950 A | 2/1989 | Glenn et al. | 350/3.61 |
| 4,915,467 A | 4/1990 | Berkey | 350/96.15 |
| 5,007,705 A | 4/1991 | Morey et al. | 350/96.29 |
| 5,042,898 A | 8/1991 | Morey et al. | 385/37 |
| 5,125,946 A | 6/1992 | Bhagavatula | 65/106 |
| 5,195,161 A | 3/1993 | Adar et al. | |
| 5,235,659 A | 8/1993 | Atkins et al. | 385/124 |
| 5,280,549 A | 1/1994 | Barnard et al. | |
| 5,283,686 A | 2/1994 | Huber | 359/337 |
| 5,388,173 A | 2/1995 | Glenn | 385/37 |
| 5,446,809 A | 8/1995 | Fritz et al. | |
| 5,457,758 A | 10/1995 | Snitzer | 385/30 |
| 5,459,801 A | 10/1995 | Snitzer | 385/30 |
| 5,469,520 A | 11/1995 | Morey et al. | 385/37 |
| 5,574,807 A | 11/1996 | Snitzer | 385/24 |
| 5,579,143 A | 11/1996 | Huber | 359/130 |

(Continued)

FOREIGN PATENT DOCUMENTS

EP 1063545 12/2000

(Continued)

OTHER PUBLICATIONS

J.A.J. Fells et al. Twin Fibre Grating Adjustable Dispersion Compensator for 40 GBIT/S, ECOC Conference 2000, Oct. 2000.

(Continued)

*Primary Examiner*—Alessandro Amari

(57) ABSTRACT

An optical filter, including a pair of Bragg grating units optically coupled to respective ports of a circulator, is provided for filtering a selected wavelength band of light from a DWDM input light. Each grating unit includes a respective tunable optical element, which have a reflective element, such as a Bragg grating. Generally, one grating unit filters a selected wavelength band of light and reflects the selected wavelength band to the other grating unit, which reflects a portion of the reflected wavelength band to an output of the optical filter. This double reflection of the selected wavelength band provides an optical filter having an effective filter function that is equal to the product of the individual filter functions of the grating units. To create a desired effective filter function, the gratings may be written to have different filter functions or grating profiles. One or both of the grating units may also be tunable to selectively create, tailor, shape or change the effective filter function of the optical filter in response to a control signal by offsetting the reflection wavelengths of the gratings, having different grating profiles.

66 Claims, 8 Drawing Sheets

U.S. PATENT DOCUMENTS

| | | |
|---|---|---|
| 5,608,571 A | 3/1997 | Epworth et al. ............ 359/341 |
| 5,608,825 A | 3/1997 | Ip ............................... 385/24 |
| 5,638,473 A | 6/1997 | Byron |
| 5,691,999 A | 11/1997 | Ball et al. ...................... 372/20 |
| 5,706,375 A | 1/1998 | Mihailov et al. ............. 385/24 |
| 5,712,717 A | 1/1998 | Hamel et al. ............... 359/130 |
| 5,717,798 A | 2/1998 | Strasser et al. ............... 385/37 |
| 5,721,796 A | 2/1998 | de Barros et al. |
| 5,726,785 A | 3/1998 | Chawki et al. ............. 359/130 |
| 5,745,626 A | 4/1998 | Duck et al. ................... 385/96 |
| 5,748,350 A | 5/1998 | Pan et al. ................... 359/130 |
| 5,771,112 A | 6/1998 | Hamel et al. ............... 359/128 |
| 5,774,606 A | 6/1998 | de Barros et al. |
| 5,815,299 A | 9/1998 | Bayart et al. ............... 359/171 |
| 5,818,986 A | 10/1998 | Asawa et al. |
| 5,825,520 A | 10/1998 | Huber ........................ 359/130 |
| 5,841,918 A | 11/1998 | Li ............................... 385/24 |
| 5,909,295 A | 6/1999 | Li et al. ..................... 359/130 |
| 5,995,155 A | 11/1999 | Schindler et al. ........... 348/461 |
| 5,995,255 A | 11/1999 | Giles .......................... 359/130 |
| 6,040,932 A | 3/2000 | Duck et al. ................. 359/124 |
| 6,061,484 A | 5/2000 | Jones et al. ................... 385/24 |
| 6,091,744 A | 7/2000 | Sorin et al. ................... 372/20 |
| 6,091,870 A | 7/2000 | Eldada ........................ 385/37 |
| 6,094,284 A | 7/2000 | Huber ........................ 359/130 |
| 6,097,487 A * | 8/2000 | Kringlebotn et al. ....... 356/345 |
| 6,141,469 A | 10/2000 | Kashyap |
| 6,160,931 A | 12/2000 | Asakura ...................... 385/24 |
| 6,229,827 B1 * | 5/2001 | Fernald et al. ................ 372/20 |
| 6,236,782 B1 * | 5/2001 | Kewitsch et al. ............. 385/43 |
| 6,310,990 B1 * | 10/2001 | Putnam et al. ................ 385/12 |
| 6,445,852 B1 * | 9/2002 | Feced et al. .................. 385/37 |

FOREIGN PATENT DOCUMENTS

| | | |
|---|---|---|
| EP | 1065813 | 1/2001 |
| EP | 1065821 | 1/2001 |
| WO | WO 8204328 | 12/1982 |
| WO | WO 9530926 | 11/1995 |
| WO | WO 0037969 | 6/2000 |
| WO | WO 0039617 | 7/2000 |

OTHER PUBLICATIONS

U.S. Appl. No. 09/455,868, filed Dec. 6, 1999—Entitled: Large Diameter Optical Waveguide, Grating and Laser.

U.S. Appl. No. 09/519,802, filed Mar. 6, 2000—Entitled: Tunable Optical Structure Featuring Feedback Control.

J.A.J. Fells et al. Twin Fibre Grating Adjustable Dispersion Compensator for 40 GBIT/S.

* cited by examiner

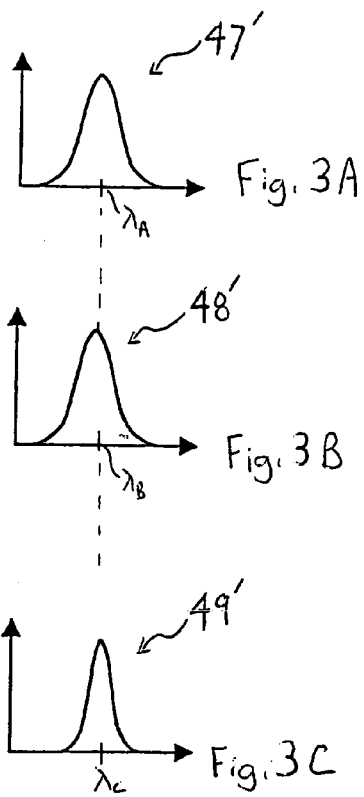
Fig. 3A
Fig. 3B
Fig. 3C
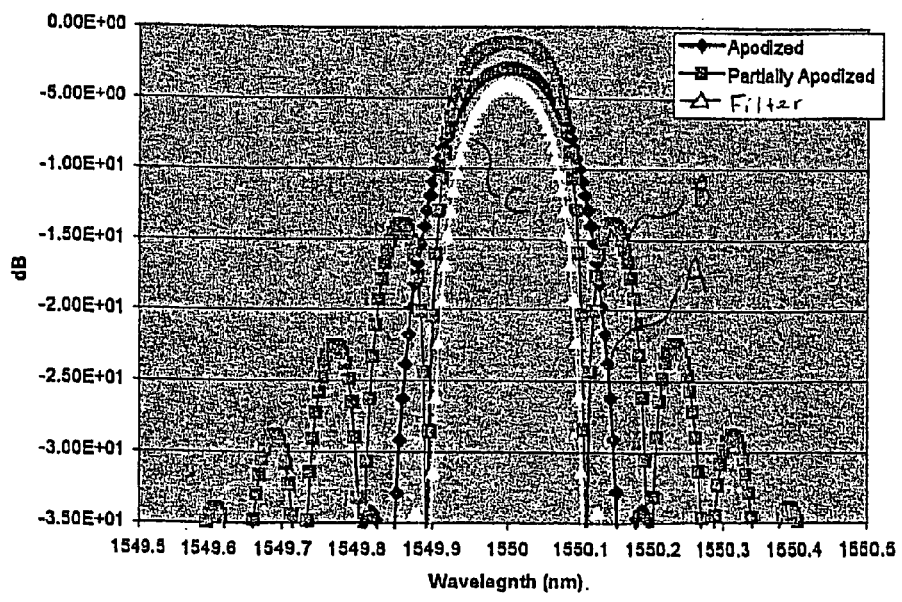
Fig. 4

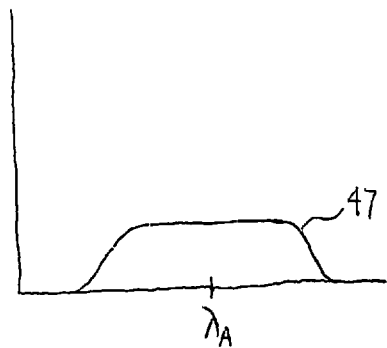
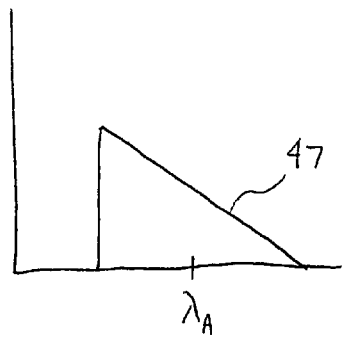
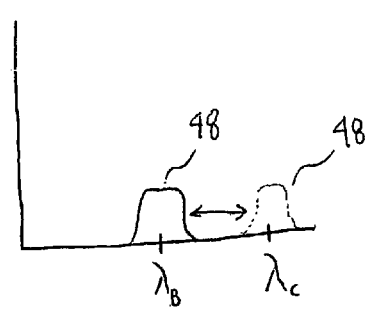
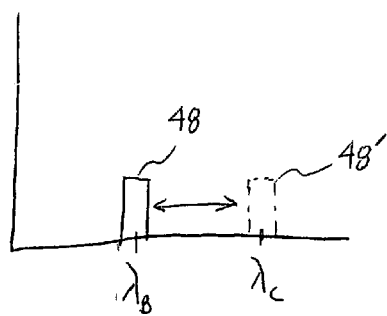
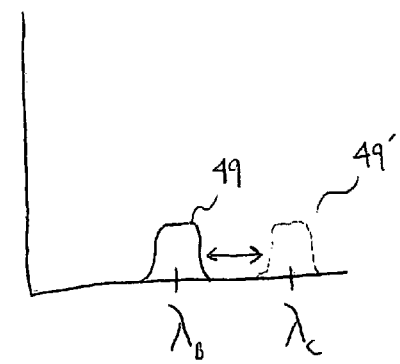
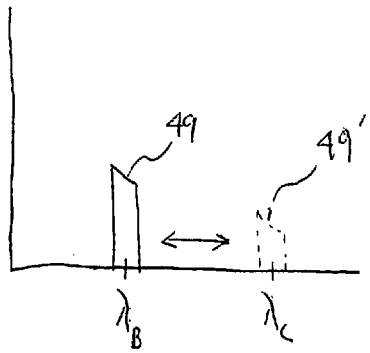
Fig. 8        Fig. 9

OPTICAL FILTER HAVING A SHAPED FILTER FUNCTION

CROSS REFERENCE TO RELATED APPLICATIONS

Co-pending U.S. patent application Ser. No. 09/648,524, entitled "Wide Range Tunable Optical Filter" filed contemporaneously herewith, contains subject matter related to that disclosed herein, and which is incorporated herein by reference in its entirety.

TECHNICAL FIELD

The present invention relates to an optical filtering device, and more particularly to an optical filter having a pair of reflective elements for shaping, changing and/or tailoring the filtering characteristics of the optical filter.

BACKGROUND ART

The telecommunication industry is turning towards optical networks to provide higher capacity (bandwidth) of data transfer for new applications. Consequently, the industry is continually developing technology to increase the bandwidth of the optical networks, which includes the technology of wavelength division multiplexing (WDM). A number of optical signals can be carried simultaneously on the optical fiber by modulating each signal on a different wavelength of light. The light propagating through a single optical fiber therefore includes a plurality of wavelength bands, referred to as channels, wherein each channel or wavelength band is centered at a respective wavelength. The wavelength bands are sufficiently separated so that they do not overlap. Typically, networks that carry approximately eight channels or more are referred to as dense wavelength division multiplexing (DWDM) systems, such systems can carry greater than 200 channels.

The technology of optical networks is heading toward a more dynamic, flexible, and intelligent networking architecture to improve service delivery time. A key element of the emerging optical network is a tunable channel optical filter for selectively filtering a channel from the DWDM light propagating through the optical network. The tunable channel filter enables a channel to be dynamically switched, routed, monitored and conditioned.

It is known in the art of optical networks that Bragg gratings written in an optical fiber may be used to act as a tunable filter, as is described in U.S. Pat. No. 5,815,299, entitled "Method and System for Equalizing Respective Power Levels of Channels of a Received Optical Frequency Division Multiplexed Signal" to Bayart et al.; U.S. Pat. No. 5,995,255, entitled "Concatenated Fiber Grating Optical Monitor" to Giles, and U.S. Pat. No. 5,579,143, entitled "Optical System With Tunable In-Fiber Gratings" to Huber.

The tunable filter described in the aforementioned U.S. Pat. Nos. 5,815,299 and 5,995,155 use a single fiber Bragg grating to filter a selected optical channel or a limited number of channels from broadband light tapped off an optical network. Consequently, the optical system requires a number of tunable filters to monitor or condition each optical channel. In some instances, the number of tunable filters can equal the number of optical channels.

It is also known in the art to add a light signal to a fiber optic transmission line using a device comprising a pair of substantially identical Bragg-Evanescent-Couplers (BEC) devices that are cascaded in series, whereby both BECs reflect light having wavelengths in the region of $\lambda_n$, as described in U.S. Pat. No. 5,459,801 to Snitzer, entitled "Coupler Used To Fabricate Add-Drop Devices, Dispersion Compensators, Amplifiers, Oscillators, Superluminescent Devices, and Communications Systems".

It is further known, as described in U.S. Pat. No. 5,841,918 to Li, entitled "Wavelength and Bandwidth Tunable Optical System" of a system for modifying an input optical signal by reducing its bandwidth and/or modifying its central wavelength. The system includes at least two optical filters optically coupled to a circulator. The first filter produces a predetermined reflected band of the input optical signal. The second filter produces a predetermined transmission band as part of the reflected band. One or both of the filters are tunable to modify the wavelength and/or bandwidth of the optical filter.

SUMMARY OF THE INVENTION

An object of the present invention is to provide a tunable optical filter having a pair of Bragg gratings that enable the effective filter characteristics of the optical filter to be shaped or tailored to provide a desired effective filter function.

In accordance with an embodiment of the present invention, an optical filter comprises a first optical element including a first reflective element for receiving light and reflecting a first wavelength band of the light centered at a first reflection wavelength. The first reflective element is characterized by a first filter function. A second optical element is optically connected to the first optical element to receive the reflected first wavelength band of the light. The second optical element includes a second reflective element for reflecting a second wavelength band of the light centered at a second reflection wavelength. The second reflective element is characterized by a second filter function, which is different than the first filter function. The first reflection wavelength and the second reflection wavelength are aligned to reflect a portion of the aligned wavelength bands to an output port.

In accordance with another embodiment of the present invention, a method for selectively filtering an optical wavelength band from an input light is provided. The method comprises providing a first optical element that includes a first reflective element for receiving the input light and reflecting a first wavelength band of the light centered at a first reflection wavelength. The first reflective element is characterized by a first filter function. A second optical element is provided that is optically connected to the first optical element to receive the reflected first wavelength band of the light. The second optical element includes a second reflective element for reflecting a second wavelength band of light centered at a second reflection wavelength. The second reflective element is characterized by a second filter function that is different than the first filter function. One of the first and second reflective elements is tuned to align approximately the first reflection wavelength and the second reflection wavelength to reflect a portion of the aligned wavelength bands to an output port.

In accordance with another embodiment of the present invention, a tunable optical filter comprises a tunable optical element for receiving light. The optical element includes a first reflective element for receiving light and reflecting a first wavelength band of the light centered at a first reflection wavelength. The first reflective element is characterized by a first filter function. The optical element also includes a second reflective element, which is optically connected to the first reflective element to receive the reflected first wavelength band of the light. The second reflective element reflects a second wavelength band of the light centered at a second reflection wavelength. The second reflective element is characterized by a second filter function. The first reflection wavelength and the second reflection wavelength are approximately aligned to reflect a portion of the aligned wavelength bands to an output port.

In accordance with another embodiment of the present invention, a compression-tuned optical filter comprises a first optical element including a first reflective element for receiving light and reflecting a first wavelength band of the light centered at a first reflection wavelength. The first reflective element is characterized by a first filter function. A second optical element is optically connected to the first optical element to receive the reflected first wavelength band of the light. The second optical element includes a second reflective element for reflecting a second wavelength band of the light centered at a second reflection wavelength. The first reflection wavelength and the second reflection wavelength are aligned to reflect a portion of the aligned wavelength bands to an output port. At least one of the first and second optical element has outer dimensions along perpendicular axial and transverse directions, and the outer dimension being at least 0.3 mm along said transverse direction. At least a portion of the respective first or second tunable element has a transverse cross-section, which is contiguous and comprises a substantially homogeneous material. The respective first or second reflective element is axially strain compressed so as to change respective first or second reflection wavelength without buckling the respective first or second tunable element in the transverse direction.

BRIEF DESCRIPTION OF THE DRAWINGS

FIGS. 3A-3C are graphical representations of the filter functions of the grating elements of the tunable optical filter of FIG. 1, and the resulting effective filter function of the optical filter, wherein the reflection wavelength of the pair of gratings are aligned;

FIG. 4 is a graphical representation of the effective filter function of the tunable optical filter of FIG. 1, and the filter functions of the grating elements of the tunable optical filter of FIG. 1, wherein the reflection characteristics of the grating elements are different;

FIGS. 5-9 are graphical representations of the effective filter function of the tunable optical filter of FIG. 1, and the filter functions of the grating elements of the tunable optical filter of FIG. 1, wherein the reflection characteristics of the grating elements are different;

BEST MODE FOR CARRYING OUT THE INVENTION

Figure 1:
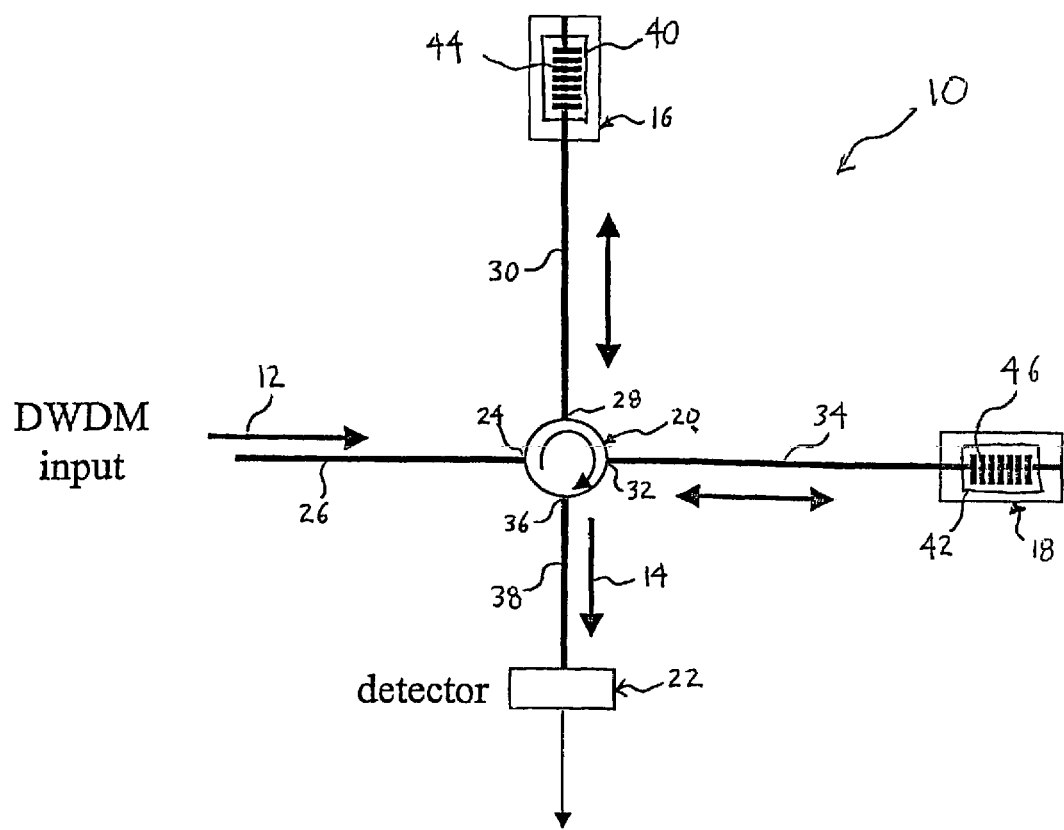
FIG. 1 is a block diagram of a tunable optical filter including a pair of grating elements in accordance with the present invention.

Referring to FIG. 1, an optical filter, generally shown as 10, filters a selected wavelength band or channel of light 14, centered at a respective channel wavelength, from a DWDM input light 12 in accordance with an effective filter function of the optical filter. In one embodiment of the present invention, the optical filter may be tunable to selectively create, tailor, shape or change the effective filter function of the optical filter 10 in response to a control signal, as will be described in greater detail hereinafter. The tunable optical filter 10 of the present invention is similar to the tunable optical filters described in co-pending U.S. patent application Ser. No. 09/648,524 entitled "Wide Range Tunable Optical Filter", which is incorporated herein by reference in its entirety.

The tunable optical filter 10 includes a pair of tunable Bragg grating units 16,18, optically coupled to respective ports of an optical directing device 20, such as a 4-port circulator. Each of the grating units 16,18 includes a respective tunable optical grating element 40,42, each having a reflective element 44,46, such as Bragg grating. The Bragg gratings 44,46 are both tunable to reflect back to the circulator 20 a wavelength band of light 14 centered at the respective wavelength, while passing the other wavelength bands of light through the gratings. The reflective characteristics of the gratings 44,46 are defined by their respective filter functions or grating profiles. The gratings 44,46 may have various grating profiles, such as Gaussian, rectangular and ramped profiles.

Generally, the grating unit 16 reflects a selected wavelength band to grating unit 18, which reflects a portion of the reflected wavelength band to an output of the optical filter 10. This double reflection technique provides an optical filter 10 having an effective filter function that is equal to the product of the individual filter functions of the grating units 16,18, as illustrated in FIGS. 2A-2C.

Specifically, a first port 24 of the circulator 20 receives the DWDM light 12 transmitted through optical fiber 26. The light 12 may originate from a light source or tapped off an optical network (not shown). The circulator 20 directs the input light 12 in a clockwise direction to the second port 28 of the circulator. The input light 12 exits the second port 28 and propagates through optical fiber 30 to a grating 44 of grating unit 16, which has a filter function 47 as shown in FIG. 2A. The grating 44 is tuned to a selected reflection wavelength $\lambda_A$ to reflect the desired wavelength band of the input light back to the second port 28 of the circulator 20, and passes the remaining wavelengths of the input light through the grating unit 16.

The circulator 20 then directs the reflected wavelength band of the light to a third port 32 of the circulator 20. The reflected wavelength band of the light exits the third port 32 and propagates through optical fiber 34 to a grating 46 of grating unit 18, which has a filter function 48 as shown in FIG. 2B. The grating 46 is tuned to a reflection wavelength $\lambda_B$, which is offset by a predetermined wavelength spacing ($\delta\lambda$). Therefore, the gratings 44,46 of the tunable optical filter 10 of FIG. 1 are centered at different reflection wavelengths $\lambda_A$, $\lambda_B$ such that the alignment of the filter functions 47,48 of the gratings 44,46 are slightly offset to create a effective filter function 49 for the optical filter 10 that is narrower than the filter functions 47,48 of the gratings 44,46, as shown in FIGS. 2A-2C. The wavelength band reflected from grating unit 18 reflects back to the third port 32 of the circulator 20, which directs the double reflected wavelength band 14 through a fourth port 36 of the circulator 20 to the output of the optical filter 10 through optical fiber 38. An optical wavelength detector 22 may be optically connected to the filter output to detect and analyze specific parameters (i.e., signal-to-noise ratio, power frequency, power density, peak wavelength, noise floor, etc.) of the selected wavelength band of light 14. One will appreciate that the detector 22 is not necessary to practice the present invention.

Figure 2A:
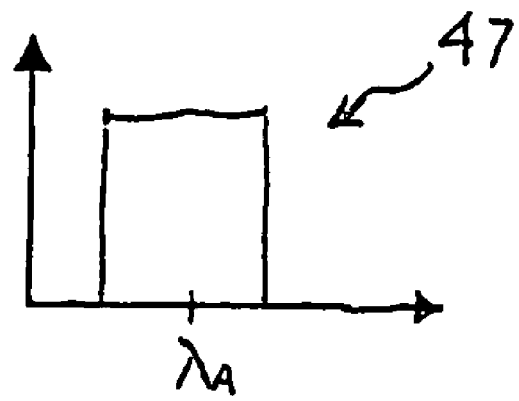
FIGS. 2A-2C are graphical representations of the filter functions of the grating elements of the tunable optical filter of FIG. 1, and the resulting effective filter function of the optical filter, wherein the reflection wavelengths of the pair of gratings are offset.
Figure 2B:
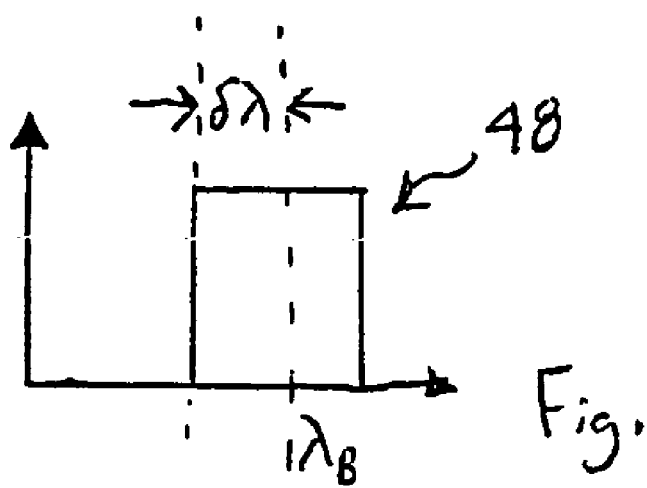
Figure 2C:
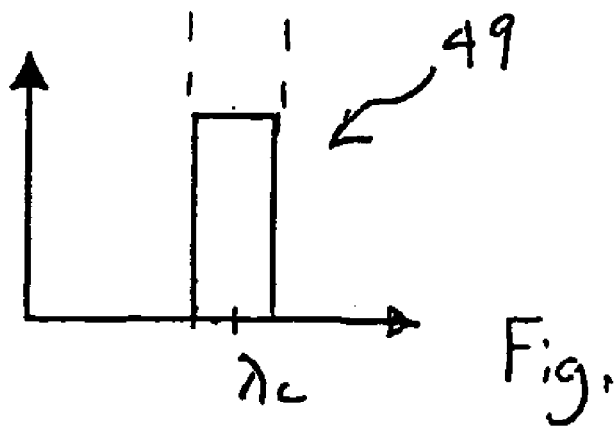

FIGS. 2A-2C are illustrative of the filter functions 47,48 of each respective grating 44,46 and the resulting effective filter function 49 of the optical filter 10. The filter function 47 of one of the gratings (i.e., 44) comprises a relatively broad wavelength band having a generally rectangular profile, centered about reflection wavelength $\lambda_A$. The filter function 48 of the other grating (i.e., 46) comprises a relatively broad wavelength band having a generally rectangular profile, centered about reflection wavelength $\lambda_B$, which is offset from wavelength $\lambda_A$. The offset is such that a desired portion of the filter functions 47,48 overlap. In accordance with the double reflection of the wavelength band described hereinbefore, the effective filter function 49 is the product of the filter functions 47,48 of the gratings 44,46. Consequently, the resulting effective filter function 49 of the optical filter 10 comprises a narrow wavelength band, centered about the reflective wavelength $\lambda_C$, which is disposed between the reflection wavelengths $\lambda_A$, $\lambda_B$. The width of the narrow wavelength band of the effective filter function 49 is defined by the offset of reflection wavelengths $\lambda_A$, $\lambda_B$.

One will appreciate that the bandwidth and/or the center wavelength of the effective filter function 49 of the optical filter 10 may be changed or tailored as desired by tuning both of the grating 44,46 to change the center reflection wavelength of one grating relative to that of the other grating. Further while the optical filter 10 described hereinbefore has two tunable grating units, one will recognize that only one of the grating units may be tunable to tailor the effective filter function of the optical filter. It should be noted that this method relies on the ability to very precisely tune the two gratings to the selected reflection wavelengths to achieve the desired filter function shape required and to assure a predictable and reproducible effective filter function of the optical filter 10, which may be provided by a compression-tuned optical filter, and is similar to that disclosed in co-pending U.S. patent application Ser. No. 09/456,112 entitled "Compression Tuned Bragg Grating and Laser", filed Dec. 6, 1999, which is incorporated herein by reference.

FIGS. 3A-3C is illustrative of the multiplicative properties of the double reflection technique described hereinabove, when the reflection wavelengths $\lambda_A$, $\lambda_B$ of the gratings are substantially aligned. As shown, the filter functions 47',48' of the gratings 44,46 and the resulting effective filter function 49' of the optical filter 10 are vertically aligned along the y-axis of each of the plots. The filter function 47' of one of the gratings (i.e., 44) is centered about reflection wavelength $\lambda_A$. The filter function 48' of the other grating (i.e., 46) is centered about reflection wavelength $\lambda_B$, which is substantially aligned with (or the same as) wavelength $\lambda_A$. The resulting effective filter function 49' of the optical filter 10 is centered about the reflective wavelength $\lambda_C$, which is substantially aligned with (or the same as) the reflection wavelengths $\lambda_A$, $\lambda_B$ of the gratings 44,46. In accordance with the multiplicative properties of the double reflection of the wavelength band of light, the effective filter function 49' is narrower than the filter functions 47',48' of the individual gratings 44,46. The double reflection of a wavelength band of light advantageously provides an optical filter 10 having a very narrow effective filter function using a pair of the gratings 44,46 having filter functions that may be wider than the desired wavelength band to be filtered.

In addition to changing the bandwidth and reflection wavelength of the effective filter function of the optical filter 10, the optical filter 10 of the present invention also enables the shape or contour of the effective filter function to be changed, created or tailored to a desire filter function by writing the gratings 44,46 with different filtering characteristics or profiles. With this approach, a desired effective filter function of the optical filter 10 can be achieved which may be very difficult or impossible to produce with a single grating.

For example, the grating elements 40,42 of the optical filter 10 may be impressed with respective gratings 44,46 centered at or tunable to a common reflection wavelength (e.g., 1550 nm) having different grating characteristics, wherein one of the gratings 44 may be fully apodized while the other grating 46 may be only partially apodized, when written by known techniques. One will appreciate that it is not critical, which of the two gratings 40,42 is fully apodized and which is partially apodized.

A graph shown in FIG. 4 illustrates of the filter function (Plot A) of the fully apodized grating 40, the filter function (Plot B) of the partially apodized grating 42, and the effective filter function (Plot C) of the tunable optical filter 10 including the fully apodized grating and the partially apodized grating. Each grating unit is modeled to be an 11 mm grating, both having the same properties of grating length and index modulation. The filter functions are superimposed on the graph centered about the reflection wavelength $\lambda_b$ of 1550 nm. The X-axis represents the wavelength (nm) of the light and the Y-axis of the graph represents the attenuation of the optical signal in decibels (dB).

Referring to Plot A, the grating characteristics of the fully apodized grating include a main peak centered at the reflection wavelength $\lambda_b$ of 1550 nm having a relative wide grating with a FWHM of ~0.15 nm, however, the grating provides substantial suppression (~30 dB) of the sidebands. In contrast, referring to Plot B, the grating characteristics of the partially apodized grating include a very narrow main peak centered about the reflection wavelength $\lambda_b$ of 1550 nm having an extremely fast rolloff of the main peak with a FWHM of ~0.1 nm. The sidebands, however, are minimally suppressed. As described above, the effective filter function of the optical filter 10, as a whole, is the product of the filter functions of the gratings 44,46 as shown in Plot C. When the product is taken of the two filter functions of the two gratings 44,46, the result is a very narrow grating with a FWHM ~0.1 nm and ~30 dB rolloff at 0.1 mm from the peak centered about the reflection wavelength $\lambda_b$ of 1550 nm, having minimal sidebands. Consequently, the present invention, having a pair of different gratings 44,46, provides an effective filtering function that includes the best properties of the two gratings, namely the very narrow main peak and the substantial suppression of the sideband wavelengths.

Figure 5:
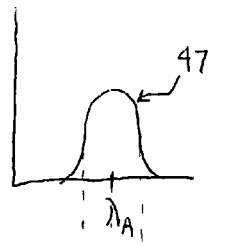
Figure 5:
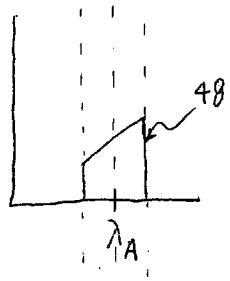
Figure 5:
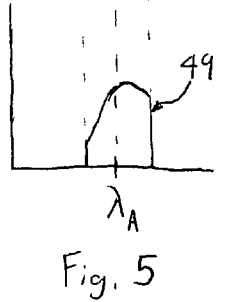
Figure 6:
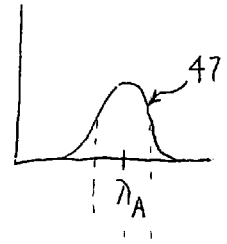
Figure 6:
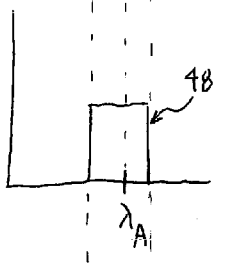
Figure 6:
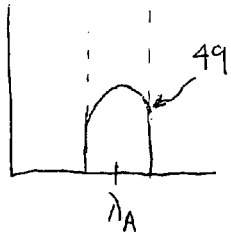
Figure 7:
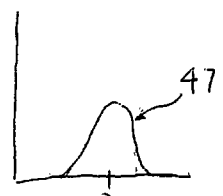
Figure 7:
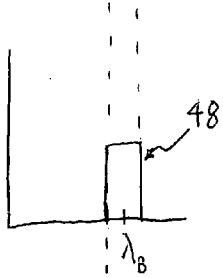
Figure 7:
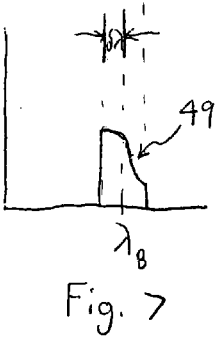

FIGS. 5 and 6 further illustrate the various possible effective filter function 49 of optical filter 10 having various shapes, resulting from the combination of different shaped filter functions 47, 48 of the gratings 44,46, which have or are tuned to the same reflection wavelength $\lambda_A$. FIG. 7 is illustrative of a possible effective filter function 49 wherein the filter functions 47, 48 of the gratings 44,46 are different and reflection wavelengths $\lambda_A$,$\lambda_B$ that are offset ($\delta\lambda$).

One will recognize that the tunability of grating units 16, 18 enables the optical filter 10 to be tuned to any desired wavelength band or channel within the tunable spectral range of the grating elements 40,42. In one mode of operation, the grating elements may be asynchronously tuned to a selected reflection wavelength to filter the respective wavelength band from the DWDM light. In another mode of operation, the grating units 16,18 may be tuned to first align the reflection wavelengths of grating elements 40,42 and then be simultaneously tuned, while maintaining alignment, to scan a predetermined spectral range.

In addition, the tunability of the grating units 16,18 also enables the effective filter function to be dynamically changed. For example, one or both of the grating elements 40,42 may be tuned to change the bandwidth, reflection wavelength and/or shape of the effective filter function of optical filter 10 to compensate for changes over time or to define a different effective filter function.

FIGS. 8 and 9 are illustrative of another alternative embodiment and mode of operation of the optical filter function of FIG. 1 to filter a portion of a reflected wavelength band. For example in FIG. 8, the grating 44 may have a generally rectangular filter function 47 tuned to or having a reflection wavelength at $\lambda_A$ and grating 46 may have a generally rectangular filter function 48 with a narrower bandwidth tuned to a reflection wavelength at $\lambda_B$. In accordance with the operation of FIG. 1 described hereinbefore, the grating 42 may be tuned selectively or in a scanning mode over a spectral range to reflect selected portions of the wavelength band of light defined by filter function 47. Also shown in broken lines are the filter function 48' of grating 46 when tuned to a reflection wavelength of $\lambda_C$ and the resulting effective filter function 49' of the optical filter.

Alternatively in FIG. 9, the grating 44 may be chirped to provide a generally ramped filter function 47 centered at reflection wavelength $\lambda_A$, while grating 46 may have a generally rectangular filter function 48 with a narrower bandwidth tuned to a reflection wavelength $\lambda_B$. Similarly, the grating 42 may be tuned selectively or in a scanning mode over a spectral range to reflect selected portions of the wavelength band of light defined by filter function 47. Also shown in broken lines are filter function 48' of grating 46, when tuned to a reflection wavelength of $\lambda_C$, and the resulting effective filter function 49' of the optical filter. It is important to note that as the filter function 48, 48' of grating 44 shifts relative to filter function 47 of grating 46, the attenuation (dB) characteristic of the effective filter function 49, 49' changes according to the slope of filter function 47.

To provide the necessary accuracy to precisely tune the gratings 44,46, the tunable grating units 16,18 may be compression-tuned using a non-optical closed control loop. The compression-tuned grating units 16,18, as will be described in greater detail hereinafter, are similar to that disclosed in co-pending U.S. patent application Ser. No. 09/456,112 entitled "Compression Tuned Bragg Grating and Laser", filed Dec. 6, 1999, which is incorporated by reference in its entirety.

Figure 10:
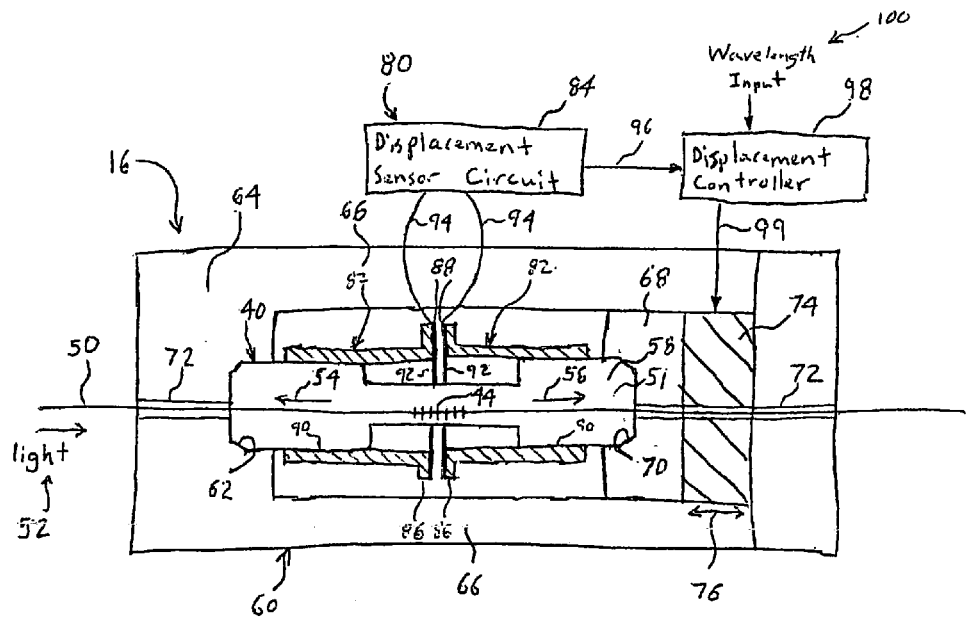
FIG. 10 is a side view of a tunable grating unit of a tunable optical filter and block diagram of a positional/force feedback control circuit in accordance with the present invention.

FIG. 10 illustrates one of the two similarly constructed, compression-tuned Bragg grating units 16,18 of FIG. 1, such as grating unit 16. The following description of grating unit 16 also applies to grating unit 18. The optical grating element 40 provided in the compression-tuned Bragg grating unit 16 may be a bulk or large diameter optical waveguide, having an outer cladding 68 and an inner core 51. The grating element 40 has an outer diameter of at least 0.3 mm and comprises silica glass ($SiO_2$) having the appropriate dopants, as is known, to allow light 52 to propagate along the inner core 51. The grating element (large diameter optical waveguide) may be formed by using fiber drawing techniques now know or later developed that provide the resultant desired dimensions for the core and the outer dimensions discussed hereinbefore, similar to that disclosed in co-pending U.S. patent application Ser. No. 09/455,868 entitled "Large Diameter Optical Waveguide, Grating, and Laser". The grating element may then be etched, grounded or machined to form a "dogbone" shape, as will be described in greater detail hereinafter. A pair of fibers or "pigtails" 50 may be attached to the ends of the grating element 40 by known techniques, such as epoxy or glass fusion)

Alternatively, the optical grating element 40 may be formed by heating, collapsing and fusing a glass capillary tube to a fiber by a laser, filament, flame, etc., as is described in copending U.S. patent application Ser. No. 9/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

A Bragg grating 44 is written (embedded or imprinted) into the inner core 106 of the grating element 40. The Bragg grating 44 reflects a portion the light 52 as indicated by a line 54 having a predetermined wavelength band of light centered at a reflection wavelength $\lambda_b$, and passes the remaining wavelengths of the incident light 52 (within a predetermined wavelength range), as indicated by a line 56. The grating, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

However, any wavelength-tunable grating or reflective element 44 embedded, written, etched, imprinted, or otherwise formed in the inner core 51 may be used if desired. As used herein, the term "grating" means any of such reflective elements. Further, the reflective element (or grating) 44 may be used in reflection and/or transmission of light.

Other materials and dimensions for the optical element 40 may be used if desired. For example, the grating element 40 may be made of any glass, e.g., silica, phosphate glass, or other glasses, or made of glass and plastic, or solely plastic.

The grating element 40 is axially compressed by a compression device or housing 60. One end of the grating element 40 is pressed against a seat 62 in one end 64 of the housing 60. The housing 60 also has a pair of arms (or sides) 66, which guide a movable block 68. The block 68 has a seat 70 that presses against the other end of the grating element 40. The axial end faces of the grating element 40 and/or the seats on mating surfaces 62,70 may be plated with a material that reduces stresses or enhances the mating of the grating element 40 with the seat on the mating surfaces. The ends of the housing 60 and the block 68 have a bore 72 drilled through them to allow the fiber 50 to pass therethrough. Instead of the recessed seats 62,70, the end 64 of the housing 60 and the block 68 may provide a planar surface for engaging flush with the respective ends of the grating element 40. The housing 60 may be assembled such that a pre-strain or no pre-stain exists on the grating element 40 prior to applying any outside forces.

An actuator 74, such as a piezoelectric actuator, engages the moveable block 68, which causes the block to move as indicated by arrows 76. Accordingly, the PZT actuator 74 provides a predetermined amount of force to the moving block 68 to compress the grating element 40, and thereby tune the grating 44 to a desired reflection wavelength. In response to control signal generated by a displacement control circuit 98 via conductor 99, the PZT actuator 74 is energized to provide the appropriate compression force necessary to tune the grating element to the desired Bragg reflection wavelength $\lambda b$ of the grating 44. The control circuit 98 adjusts the expansion and retraction of the actuator 74 in response to a wavelength input command 100 and a displacement sensor 80 that provides feedback representative of the strain or compression of the grating element 40 to form a non-optical closed-loop control configuration. In other words, light 52 propagating through the network or device is not used to provide feedback for the tuning of the grating 44.

In one embodiment, the displacement sensor 80 includes a pair of capacitive elements 82 and a displacement sensor circuit 84, similar to that disclosed in co-pending U.S. patent application Ser. No. 09/519,802 entitled, "Tunable Optical Structure Featuring Feedback Control", filed Mar. 6, 2000, which is incorporated by reference in its entirety. As shown in FIG. 10, each capacitive element 82 is generally tubular having an annular ridge 86 extending outwardly from one end, which provides a capacitive surface 88. The capacitive elements 82 are mounted to respective ends of the grating element 40 at 90 such that the capacitive surfaces 88 are spaced a predetermined distance apart, for example, approximately 1-2 microns. Other spacings may be used if desired. The capacitive elements 82 may be bonded or secured using an epoxy or other adhesive compound, or fused to grating element 40 using a $CO_2$ laser or other heating element. The capacitive surfaces 88 are coated with a metallic coating, such as gold, to form a pair of annular capacitive plates 92. The change in capacitance depends on the change in the spacing between the capacitive plates.

Electrodes 94 are attached to the capacitive plates 92 to connect the capacitor to the displacement sensor circuit 84. The sensor circuit 84 measures the capacitance between the capacitive plates 92; and provides a sensed signal 96, indicative of the measured capacitance, to the displacement controller 98. As the grating element 40 is strained, the gap between the parallel capacitive plates 92 will vary, thereby causing the capacitance to change correspondingly. Specifically, as the grating 44 is compressed, the gap between the capacitive plates 92 is reduced, resulting in an increase in capacitance. The change in capacitance is inversely proportional to the change in the reflection wavelength $\lambda_b$ of the grating 44. Since the capacitive elements 82 are directly connected to the grating element 44, the capacitive elements 82 are passive and will not slip. One skilled in the art would be able to implement without undue experimentation, the sensor electronics circuit 84 to measure the change in capacitance between the two capacitive plates 92.

In the operation of the grating unit 16, the controller 100 receives the wavelength input signal 100, which represents the desired reflection wavelength to tune the grating unit. In response to the input signal 100 and the sensed signal 96, which is representative of the present reflection wavelength $\lambda_b$ of the grating 44, the controller 98 provides a control signal to the actuator 74 to increase or decrease the compression force applied to the grating element 40 to set the desired reflection wavelength of the grating 44. The change in applied force to the grating element 40 changes the spacing between the ends of the gratings 44, and therefore, the spacing between the capacitive plates 92. As described above, the change in spacing of the capacitive plates 92 changes the capacitance between the capacitance plates provided to the sensor circuit 84, and thereby provides feedback to displacement controller. While the sensor circuit 84 and the controller 98 has been shown as two separate components, one would recognize that the functions of these components may be combined into a single component. One example of a closed loop actuator 74 that may be used is Model No. CM (controller) and DPT-C-M (for a cylindrical actuator) made by Queensgate, Inc. of N.Y.

Although the invention has been described with respect to using a capacitor to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the grating elements, one should recognize that the grating units may be accurately and repeatably compression and thus operating in an open loop mode.

Alternatively, instead of using a piezoelectric actuator 74, the grating element 40 may be compressed by another actuator, such as a solenoid, pneumatic force actuator, or any other device that is capable of directly or indirectly applying an axial compressive force on the grating element 40. Further, a stepper motor or other type of motor whose rotation or position can be controlled may be used to compress the grating element. A mechanical linkage connects the motor, e.g., a screw drive, linear actuator, gears, and/or a cam, to the movable block 68 (or piston), which cause the block 68 to move as indicated by arrows 76. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference.

Alternatively, the gratings 44,46 may be tuned by mechanically stressing (i.e. tension, bending the grating elements, or varying the temperature of the grating (i.e., using a heater), such as that described in U.S. Pat. No. 5,007,705, entitled "Variable Optical Fiber Bragg Filter Arrangement", to Morey et al., which is incorporated herein by reference, provided the gratings may be tuned precisely to accurately align the filter functions relative to each other. Furthermore, while grating 44,46 have been described as being within a grating element 16 in the form of a bulk waveguide, one will appreciate that the gratings may be written into a fiber, wherein grating may be tuned thermally or mechanically (compression or tension).

Figure 11:
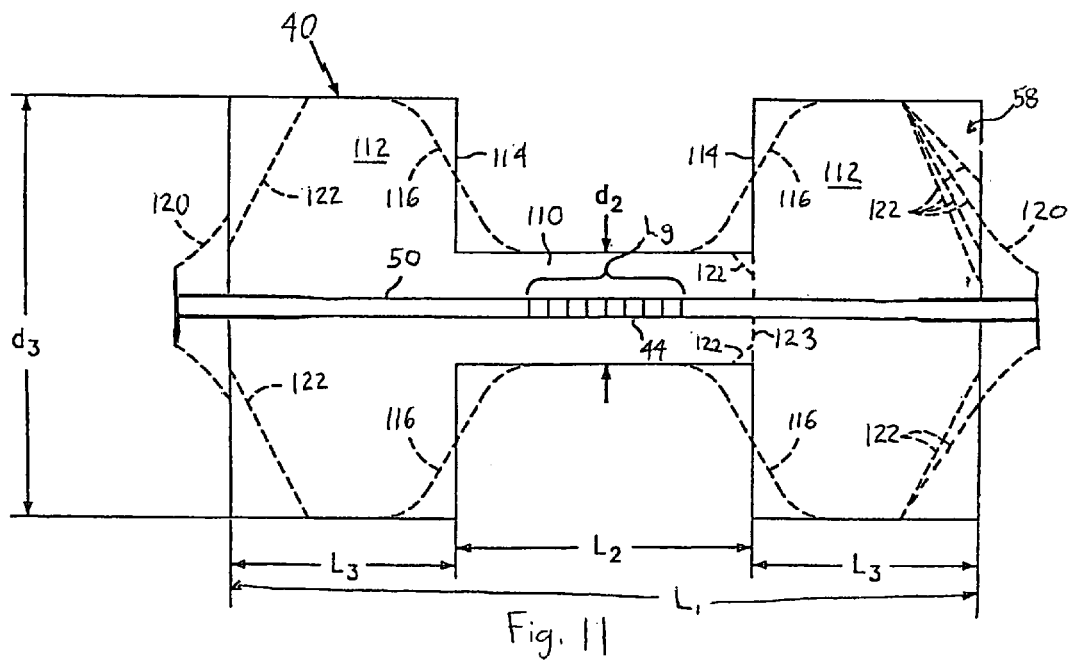
FIG. 11 is a side view of a grating element of a tunable optical filter in accordance with the present invention.

As shown in FIG. 11, the grating element 40 may have a "dogbone" shape having a narrow central section 110 and larger outer sections 112. Advantageously, the dogbone shape provides increased sensitivity in converting force applied by the actuator 74 to wavelength shift of the grating 44 to assure accurate tuning of the grating. The narrow section 110 may have an outer diameter d2 of about 0.8-1 mm, and a length L2 of about 5-20 mm. The large sections 112 each have a diameter d3 of about 3 mm and a length L3 of about 2-5 mm. The overall length L1 is about 10-30 mm and the grating 44 has a length Lg of about 5-20 mm. Other lengths and diameters of the sections 110,112 may be used. Other dimensions and lengths for the grating element 40 and the grating 44 may be used.

An inner transition region 114 of the large sections 112 may be a sharp vertical or angled edge or may be curved as indicated by dashed lines 116. A curved geometry has less stress risers than a sharp edge and thus may reduce the likelihood of breakage. Also, the large sections 112 of the tube 58 may have the inner tapered regions 118 or the outer fluted sections 120 at the ends of the tube 58. Further, the large sections 112 may have the tapered (or beveled) outer corners 122.

It has been found that such a dimension change between the dimension d3 of the large section 112 and the dimension d2 of the narrow section 110 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The grating element 40 may have tapered (or beveled or angled) outer corners or edges 122 to provide a seat for the tube to mate with housing 60 and moving block 68 and/or to adjust the force angles on the grating element, or for other reasons. The angle of the beveled corners 122 is set to achieve the desired function. In addition, one or both of the axial ends of the grating element 40 where the fiber 50 attaches may have an outer tapered (or fluted, conical, or nipple) axial section, shown as dashed lines 120.

Figure 12:
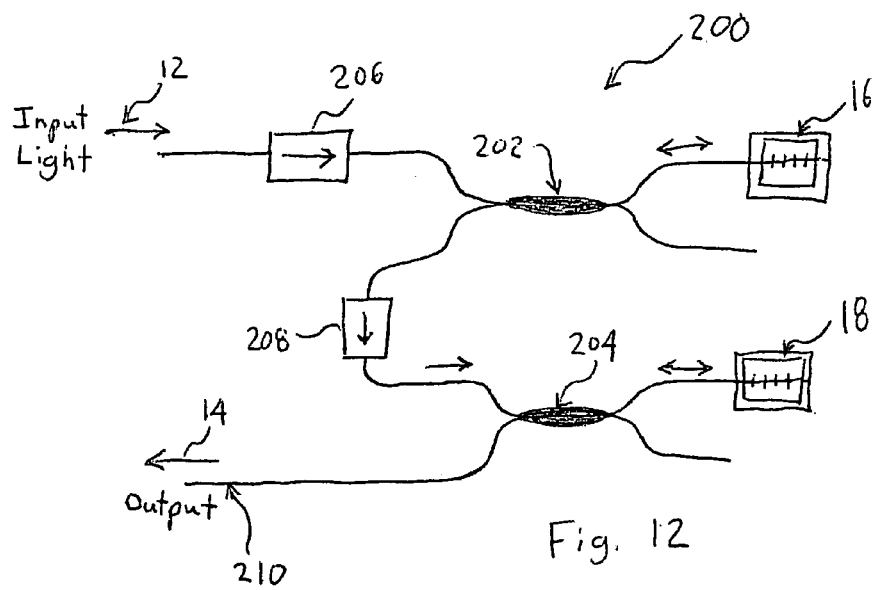
FIG. 12 is a block diagram of another embodiment of a tunable optical filter in accordance with the present invention.

While the grating units 16,18 of the tunable optical filter 10 are optical interconnected to a 4-port circulator, one will appreciate that it is within the cope of the present invention that any optical directing device or means may be substituted for the circulator, such as an optical coupler, optical splitter or free space. For example, referring to FIG. 12, another embodiment of an optical filter 200 is shown using a pair of optical couplers 202, 204 and a pair of optical isolators 206, 208 which function to direct the optical signals similar to that of the circulator 20 described hereinbefore. In the following description of the optical filter 200, components and features common to the previously described embodiment have the same reference numbers, and therefore are not described in detail. The coupler 202 receives the input light 12 to grating unit 16, which reflects a selected wavelength band of light back to the coupler 202. The reflected wavelength band passes to coupler 204 through the optical isolator 208. The optical coupler 204 passes the reflected wavelength band of light to grating unit 18, which reflects a portion of the reflected wavelength band. The coupler 204 then passes the twice, reflected wavelength band to the output 210 of the optical filter 200.

Figure 13:
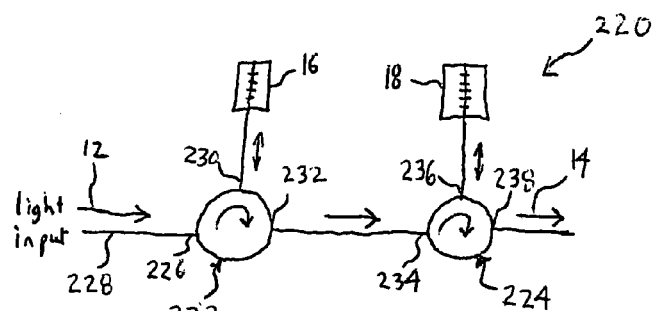
FIG. 13 is a block diagram of another embodiment of a tunable optical filter in accordance with of the present invention.

Referring to FIG. 13, one will appreciate that the 4-port circulator 20 of the optical filter 10 of FIG. 1 may be substituted for a pair of 3-port circulars 222,224 optically connected in series, and still take full advantage of the benefits attributed to the double reflection of the selected wavelength band filtered from the input light 12.

In the operation of the tunable optical filter 220 of FIG. 13, a first port 226 of circulator 222 receives the input light 12. The circulator 222 directs the input light 12 in a clockwise direction from the first port 226 to a second port 230 thereof. The input light 12 exits the second port 230 and propagates to grating unit 16, which is tuned to reflect a selected wavelength band of light back to the second port of circulator 222, and passes the remaining wavelength bands of light therethrough. The circulator 222 then directs the reflected wavelength of light to a third port 232. The reflected wavelength of light exits the third port 232 and propagates to a first port 234 of circulator 224. The circulator 224 directs the reflected wavelength to a second port 236 to grating unit 18, which reflects a portion of the reflected wavelength band back to the second port 236. The circulator 224 directs the double reflected wavelength band from the second port 236 to a third port 238 and exits circulator 224.

Figure 14:
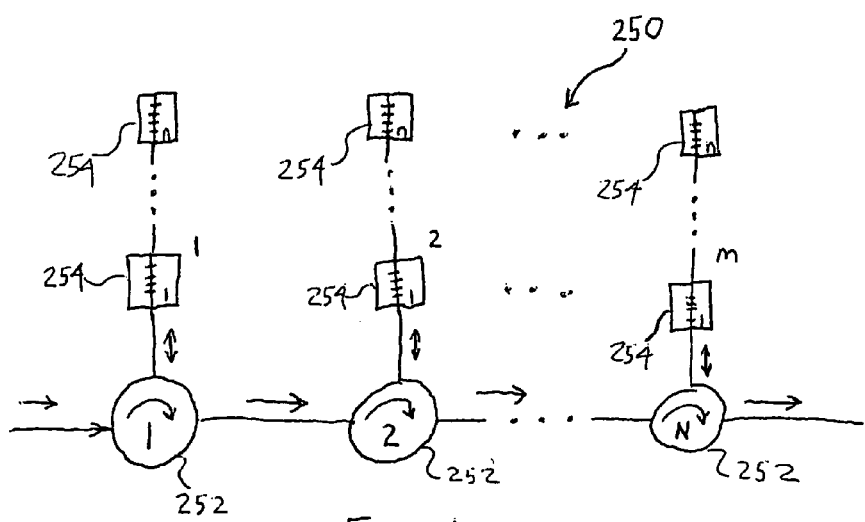
FIG. 14 is a block diagram of another embodiment of a tunable optical filter in accordance with the present invention.

FIG. 14 illustrates another embodiment of a tunable optical filter 250 that includes a plurality of 3-port circulators optically connected in series, similar to the optical filter 200 of FIG. 13. The optical filter may include 1-N circulators 252 having at least one tunable grating unit 254 optically connected to one port of the circulators to provide 1-m grating units. Each of the grating units 254 may have different filtering characteristics (i.e., fully apodized, partially apodized) and/or have filter functions having the reflection wavelengths slightly offset to increase the flexibility for creating a particular effective filter function of the optical filter 250. To further add to the ability to create a specific effective filter function, a plurality of grating units (i.e., 1-$n$) having different grating characteristics and/or have filter functions having reflection wavelengths slightly offset may be serially connected to each respective port of a circulator. Alternatively, the grating units (1-$n$) optically connected to a port of a circulator may be substituted for a single grating unit that includes a single grating element 40 having a plurality of gratings written in the core. The grating may be written in series along the core or over each other in a co-located manner.

While FIGS. 13 and 14 illustrate various configurations to take advantage of various filtering properties or characteristics of the multiple gratings to create a desired effective filtering function, one will appreciate that a number configurations using a number of different gratings and circulators is possible. For example, four grating units may be optically connected to four respective ports of a 6-port circulator, similar to the configuration of the optical filter of FIG. 1.

Figure 15:
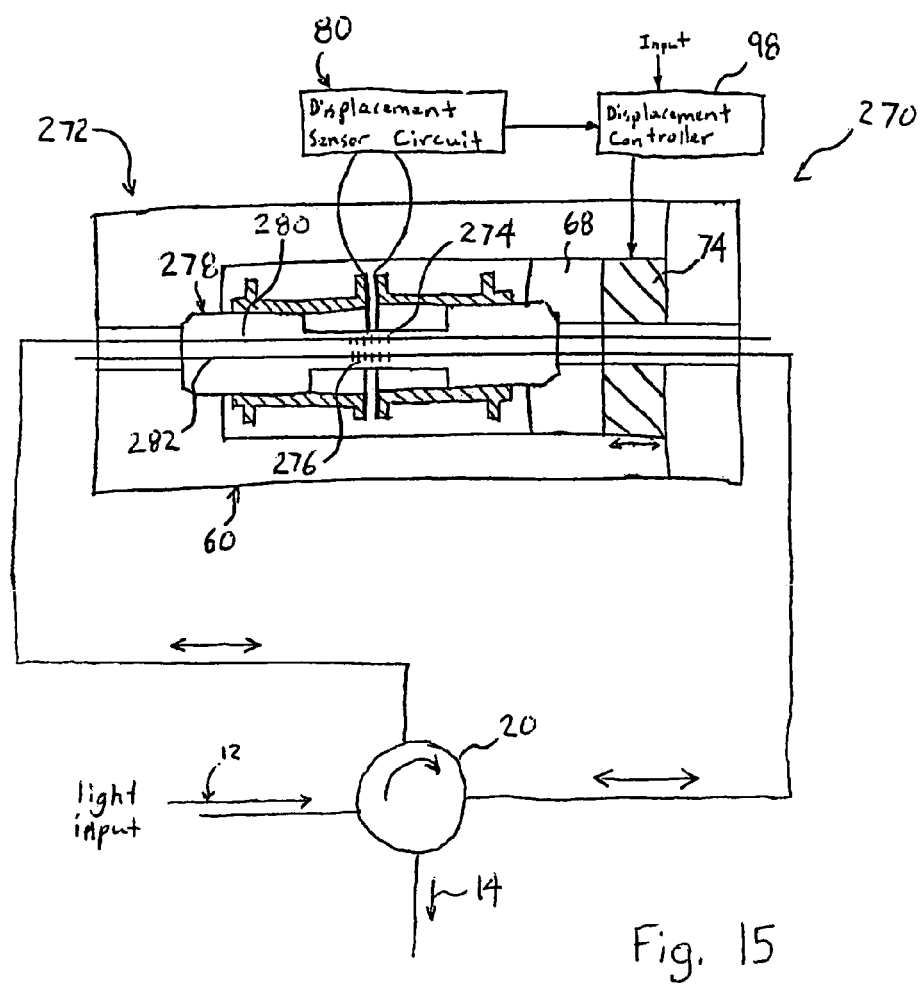
FIG. 15 is a block diagram of another embodiment of a tunable optical filter showing a side view of a tunable grating unit having a dual-core grating element in accordance with the present invention.

Referring to FIG. 15, another embodiment of the present invention includes a tunable optical filter 270 similar to the optical filter 10 of FIG. 1, except that the grating units 16,18 of FIG. 1 are combined into a single grating unit 272, wherein the two gratings 274,276 are written into a single grating element 278. In the following description of the optical filter 270, components and features common to the previously described embodiments have the same reference numbers, and therefore are not described in detail. The grating element 278 comprises a dual core waveguide formed of collapsed fiber or cane, as described hereinbefore. The first grating 274 is written axially in a first core 280 of the grating element 278 and the second grating 276 is written axially in the second core 282 of the grating element. The gratings are sufficiently spaced apart to prevent or minimize cross-talk or coupling between the gratings 274,276. The reflective characteristics of each grating 274,276 may have similar or different reflective characteristics. For example, the gratings may have similar filter functions centered at the same reflection wavelength $\lambda_b$ as described in the embodiment of FIG. 1, different filter functions centered at the same reflection wavelength $\lambda_b$ as described in the embodiment of FIGS. 5-10, or similar filter functions centered at reflection wavelengths that are slightly offset as described in FIGS. 2A-2C.

The operation is substantially the same as the operation of the optical filter 10 of FIG. 1 except the first and second gratings 274,276 are tuned simultaneously using a common actuator 74 and feedback control 80,98. Advantageously, the use of a dual core waveguide permits a single housing 60 and feedback control 88,98 to control the tuning of the grating element 278 to assure simultaneous tuning of both gratings, thus resulting in the gratings remaining aligned relative to each other.

While the present invention has been described hereinabove as having a pair of tunable grating units 16, 18, one will recognize that it is not necessary for the grating units to be tunable to take advantage of the benefits of the double reflection technique described hereinbefore. In fact, one or both of the grating units may be fixed. For example, the gratings 40,42 may be written to have different reflective characteristics and calibrated to align the reflection wavelengths, similar to that shown in FIGS. 5 and 6.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical filter comprising:
a first optical element including a first reflective element for receiving light and reflecting a first wavelength band of the light centered at a first reflective wavelength, the first reflective element characterized by a first reflective filter function; and
a second optical element, optically connected to the first a second optical element to receive the reflected first wavelength band of the light, including a second reflective element for reflecting a second wavelength band of the light centered at a second reflection wavelength, the second reflective element characterized by a second reflective filter function, whereby at least one of the first reflective filter function and the second reflective filter function is not substantially flat over a substantial portion of the respective first or second reflective filter function, and the first wavelength band and the second wavelength band overlap spectrally.

2. The optical filter of claim 1, wherein one of the first and second optical elements is tunable to change the corresponding first or second reflection wavelength.

3. The optical filter of claim 2 further includes a compression device that axially compresses at least one of the first and second optical elements, wherein at least one of the respective first and second reflective elements is disposed along an axial direction of the respective first and second optical elements.

4. The optical filter of claim 2 further includes:
a first compressing device for axially compressing at least the first optical element to tune the first reflective element, responsive to a displacement signal, wherein the first reflective element is disposed axially along the first optical element; and
a displacement sensor, responsive to the compression of the first optical element, for providing the displacement signal indicative of the change in the displacement of the first optical element.

5. The optical filter of claim 4, wherein the displacement sensor includes a capacitance sensor coupled to the first optical element for measuring the change in the capacitance that depends on the change in the displacement of the first optical element.

6. The optical filter of claim 1, wherein both of the first and second optical elements is tunable to change each of the respective first and second wavelengths.

7. The optical filter of claim 6 further comprising:
a first compressing device for compressing axially the first element to tune the first reflective element, wherein the first reflective element is written in the longitudinal direction in the first optical element; and
a second compressing device for compressing axially the second optical element to tune the second reflective element, wherein the second reflective element is written in the direction in the second optical element.

8. The optical filter of claim 1, further comprising:
an optical directing device optically connected to the first and second optical elements; the optical directing device directing the light to the first reflective element, directing the first wavelength band reflected from the first reflective element to the second reflective element, and directing the second wavelength band reflected from the second reflective element to the output port of the optical directing device.

9. The optical filter of claim 8, wherein the optical directing device comprises at least one circulator.

10. The optical filter of claim 9 wherein the circulator receives the light at a first port of the circulator, directs the light to the first reflective element through a second port of the circulator, receives the first wavelength band at the second port, directs the first wavelength band to the second reflective element through a third port of the circulator, receives the second wavelength band at the third port, and directs the second wavelength band to a fourth port of the circulator.

11. The optical filter of claim 8 wherein said optical directing device comprises an optical coupler.

12. The optical filter of claim 1, wherein the first reflection wavelength and the second reflection wavelength are substantially aligned to reflect a portion of the aligned wavelength bands to an output port.

13. The optical filter of claim 1, wherein one of the first and second reflective filter functions comprises one of a Gaussian, rectangular and ramp shape.

14. The optical filter of claim 1, wherein one of the first and second reflective elements is fully apodized and the other of the first and second reflective elements is partially apodized.

15. The optical filter of claim 1, wherein the first reflection wavelength is offset a predetermined spacing from the second reflection wavelength.

16. The optical filter of claim 1, wherein at least one of the first and second optical elements have an outer cladding and an inner core disposed therein, wherein the at least one of the first and second reflective element comprises a grating disposed in a longitudinal direction of the inner core.

17. The optical filter of claim 16, wherein the at least one of the first and second optical elements comprises:
an optical fiber, having a reflective element written therein; and
a tube, having the optical fiber and the reflective element encased therein along a longitudinal axis of the tube, the tube being fused to at least a portion of the fiber.

18. The optical filter of claim 16, wherein the at least one of the first and second optical elements is an optical waveguide having an outer transverse dimension of at least 0.3 mm.

19. The optical filter of claim 16, wherein the at least one of the first and second optical elements is an optical fiber.

20. The optical filter of claim 1 further includes a straining device for tensioning axially the first optical element to tune the first reflective element, wherein the first reflective element is disposed along an axial direction of the first optical element.

21. The optical filter of claim 1 further includes a heating element for varying the temperature of the first optical element to tune the first reflective element to reflect the selected first wavelength band.

22. The optical filter of claim 1, wherein the at least one of the first and second optical waveguides has outer dimensions along perpendicular axial and transverse directions, a first portion of the at least one of the first and second optical waveguides having an outer dimension being at least 0.3 mm along said transverse direction, at least a portion of the first portion having a transverse cross-section which is continuous and comprises a substantially homogeneous material; and the at least one of the first and second optical waveguides being axially strain compressed so as to change the at least one of the first and second reflection wavelengths.

23. The optical filter of claim 22, wherein both of the first and second optical waveguides is tunable to change each of the respective first and second reflection wavelengths.

24. The optical filter of claim 22, wherein the first reflection wavelength and the second reflection wavelength are substantially aligned to reflect a portion of the aligned wavelength bands to an output port.

25. The optical filter of claim 22, wherein one of the first and second filter functions comprises one of a Gaussian, rectangular and ramp shape.

26. The optical filter of claim 22, wherein one of the first and second reflective elements is fully apodized and the other of the first and second reflective elements is partially apodized.

27. The optical filter of claim 22, wherein the first reflection wavelength is offset a predetermined spacing from the second reflection wavelength.

28. The optical filter of claim 22, wherein at least one of the first and second reflective elements includes a Bragg grating.

29. The optical filter of claim 22 further includes a compression device that axially compresses at least one of the first and second optical waveguides, wherein at least one of the respective first and second reflective elements is disposed along an axial direction of the respective first and second tunable elements.

30. A tunable optical filter comprising:
a tunable optical waveguide for receiving light, the tunable optical waveguide comprising:
a first inner core having a first reflective element disposed therein, the first reflective element receiving the light and reflecting a first wavelength band of the light centered at a first reflection wavelength, the first reflective element characterized by a first reflective filter function; and
a second inner core having a second reflective element disposed therein, the second inner core being optically connected to the first inner core to receive the reflected first wavelength band of the light, the second reflective element reflecting a second wavelength band of the light centered at a second reflection wavelength, the second reflective element characterized by a second reflective filter function.

31. The optical filter in claim 30, wherein the first and second reflective elements include a respective Bragg grating.

32. The optical filter of claim 30, wherein the tunable optical waveguide has an outer transverse dimension of at least 0.3 mm.

33. The optical filter of claim 30, further comprising:
an optical directing device optically connected to the first and second inner cores; the optical directing device directing the light to the first reflective element, directing the first wavelength band reflected from the first reflective element to the second reflective element.

34. The optical filter of claim 33, wherein the optical directing device comprises at least one circulator.

35. The optical filter in claim 30, further includes a compressing device for axially compressing the tunable optical waveguide to tune the first and second reflective elements.

36. The optical filter of claim 30, wherein the first and second reflection wavelengths are substantially aligned.

37. The optical filter of claim 30, wherein at least one of the first reflective filter function and the second reflective filter function is not substantially flat over a substantial portion of the respective first or second reflective filter function, and the first wavelength band and the second wavelength band overlap spectrally.

38. The optical filter of claim 37, wherein one of the first and second reflective filter functions comprises one of a Gaussian, rectangular and ramp shape.

39. The optical filter of claim 37, wherein one of the first and second reflective elements is fully apodized and the other of the first and second reflective elements is partially apodized.

40. The optical filter of claim 37, wherein the shape of the first reflective filter function is different than the shape of the second reflective filter function.

41. The optical filter of claim 30, wherein the first wavelength band and the second wavelength band overlap spectrally.

42. The optical filter of claim 41, wherein the first and second reflection wavelengths are offset by a predetermined spacing.

43. The optical filter of claim 30 further includes:
a compressing device for axially compressing the tunable optical waveguide to tune the first and second reflective elements, responsive to a displacement signal, wherein the first and second reflective elements are disposed axially along the tunable optical waveguide; and
a displacement sensor, responsive to the compression of the tunable optical waveguide, for providing the displacement signal indicative of the change in the displacement of the tunable optical waveguide.

44. A method for filtering an input light; the method comprising:
providing a first optical element including a first reflective element for receiving the input light and reflecting a first wavelength band of the light centered at a first reflection wavelength, the first reflective element characterized by a first reflective filter function;
providing a second optical element, optically connected to the first optical element to receive the reflected first wavelength band of the light, including a second reflective element for reflecting a second wavelength band of light centered at a second reflection wavelength, the second reflective element characterized by a second reflective filter function, whereby at least one of the first reflective filter function and the second reflective filter function is not substantially flat over a substantial portion of the respective first or second reflective filter function; and
tuning one of the first and second reflective elements to overlap spectrally the first wavelength band and the second wavelength band.

45. The method of claim 44 wherein the tuning one of the first and second reflective elements includes compressing the one of the first and second optical elements.

46. The method of claim 44, wherein the tuning one of the first and second reflective elements comprises:
substantially aligning the first reflection wavelength and the second reflection wavelength.

47. The method of claim 44, wherein one of the first and second reflective elements is fully apodized and the other of the first and second reflective elements is partially apodized.

48. The method of claim 44, wherein the tuning one of the first and second reflective elements comprises:
offsetting the first reflection wavelength and the second reflection wavelength by a predetermined spacing.

49. The method of claim 44, further comprising tuning the other one of the first and second reflective elements to overlap spectrally the first wavelength band and the second wavelength band.

50. The method of claim 44, wherein one of the first and second reflective filter functions comprises one of a Gaussian, rectangular and ramp shape.

51. The method of claim 44, wherein at least one of the first and second optical elements comprises an optical waveguide having an outer cladding and an inner core disposed therein, wherein the at least one of the first and second reflective element comprises a grating disposed in a longitudinal direction of the inner core.

52. The method of claim 51, wherein the at least one of the first and second optical elements is an optical waveguide having an outer transverse dimension of at least 0.3 mm.

53. The method of claim 51, wherein the at least one of the first and second optical elements is an optical fiber.

54. An optical filter comprising:
a first optical waveguide including a first reflective element for receiving light and reflecting a first wavelength band of the light centered at a first reflection wavelength, the first reflective element characterized by a first reflective filter function; and
a second optical waveguide, optically connected to the first optical waveguide to receive the reflected first wavelength band of the light, including a second reflective element for reflecting a second wavelength band of the light centered at a second reflection wavelength, the second reflective element characterized by a second reflective filter function;
whereby the first reflection wavelength and the second reflection wavelength are substantially the same.

55. The optical filter of claim 54, wherein one of the first and second optical waveguides is tunable to change the corresponding first or second reflection wavelength, and maintain substantial alignment of the first and second reflection wavelengths.

56. The optical filter of claim 55 further includes a compression device that axially compresses at least one of the first and second tunable optical waveguides, wherein at least one of the respective first and second reflective elements is disposed along an axial direction of the respective first and second optical waveguides.

57. The optical filter of claim 54, wherein both of the first and second optical waveguides is tunable to change each of the respective first and second reflection wavelengths, and maintain substantial alignment of the first and second reflection wavelengths.

58. The optical filter of claim 54, further comprising:
an optical directing device optically coupled to the first and second optical waveguides; the optical directing device directing the light to the first reflective element, directing the first wavelength band reflected from the first reflective element to the second reflective element.

59. The optical filter of claim 54, wherein one of the first and second reflective filter functions comprises one of a Gaussian, rectangular and ramp shape.

60. The optical filter of claim 54, wherein one of the first and second reflective elements is fully apodized and the other of the first and second reflective elements is partially apodized.

61. The optical filter of claim 54, wherein at least one of the first and second reflective elements includes a Bragg grating.

62. The optical filter of claim 61, wherein a portion of the at least one of the first and second optical waveguides has an outer transverse dimension of at least 0.3 mm.

63. The optical filter of claim 61, wherein the at least one of the first and second optical waveguides is an optical fiber.

64. The optical filter of claim 54, wherein the shape of the first reflective filter function is different than the shape of the second reflective filter function.

65. An optical filter comprising:
a first optical element including a first reflective element for receiving light and reflecting a first wavelength band of the light centered at a first reflection wavelength, the first reflective element characterized by a first reflective filter function; and
a second optical element, optically connected to the first optical element to receive the reflected first wavelength band of the light, including a second reflective element for reflecting a second wavelength band of the light centered at a second reflection wavelength, the second reflective element characterized by a second reflective filter function, whereby at least one of the first reflective filter function and the second reflective filter function is not substantially constant over a substantial portion of the respective first or second reflective filter function, and the first wavelength band and the second wavelength band overlap spectrally.

66. An optical filter comprising;
a first optical element including a first reflective element for receiving light and reflecting a first wavelength band of the light centered at a first reflection wavelength, the first reflective element characterized by a first reflective filter function; and
a second optical element, optically connected to the first optical element to receive the reflected first wavelength band of the light, including a second reflective element for reflecting a second wavelength band of the light centered at a second reflection wavelength, the second reflective element characterized by a second reflective filter function, whereby at least one of the first reflective filter function and the second reflective filter function is not substantially rectangular or square in shape, and the first wavelength band and the second wavelength band overlap spectrally.

* * * * *

UNITED STATES PATENT AND TRADEMARK OFFICE
CERTIFICATE OF CORRECTION

PATENT NO. : 7,386,204 B1  Page 1 of 1
APPLICATION NO. : 09/648525
DATED : June 10, 2008
INVENTOR(S) : Michael A. Davis et al.

It is certified that error appears in the above-identified patent and that said Letters Patent is hereby corrected as shown below:

Column 1 at line 57, "5,995,155" should be --5,995,255--.
Column 6 at line 61, "mm" should be --nm--.
Column 9 at line 15, "pre-stain" should be --pre-strain--.
Column 11 at line 52, "cope" should be --scope--.

Signed and Sealed this

Sixteenth Day of March, 2010

David J. Kappos
*Director of the United States Patent and Trademark Office*